United States Patent
Freking et al.

(10) Patent No.: US 7,413,336 B2
(45) Date of Patent: Aug. 19, 2008

(54) ADHESIVE STACKING FOR MULTIPLE OPTICAL FILMS

(75) Inventors: Anthony J. Freking, Vadnais Heights, MN (US); Keith M. Kotchick, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/652,998

(22) Filed: Aug. 29, 2003

(65) Prior Publication Data

US 2005/0046767 A1    Mar. 3, 2005

(51) Int. Cl.
*F21V 7/04* (2006.01)
(52) U.S. Cl. ........................... 362/627; 362/606
(58) Field of Classification Search ................ 362/601, 362/606, 615, 620, 622, 624, 627, 633; 349/115, 349/112
See application file for complete search history.

(56) References Cited

U.S. PATENT DOCUMENTS

| | | | |
|---|---|---|---|
| 3,531,358 A | 9/1970 | Rost et al. | |
| 3,754,813 A | 8/1973 | DePalma | |
| 3,765,281 A | 10/1973 | Wolfe | |
| 3,788,171 A | 1/1974 | Hoadley | |
| 3,851,093 A | 11/1974 | Sunstein | |
| RE29,091 E | 12/1976 | De Palma | |
| 4,542,449 A * | 9/1985 | Whitehead | 362/330 |
| 4,576,850 A | 3/1986 | Martens | |
| 4,713,273 A | 12/1987 | Freedman | |
| 4,791,540 A | 12/1988 | Dreyer, Jr. | |
| 4,804,253 A | 2/1989 | Stewart | |
| 4,906,070 A | 3/1990 | Cobb, Jr. | |
| 4,971,719 A | 11/1990 | Vaz et al. | |
| 4,984,144 A | 1/1991 | Cobb, Jr. et al. | |
| 5,005,108 A | 4/1991 | Pristash | |
| 5,076,668 A | 12/1991 | Dalisa | |
| 5,128,783 A | 7/1992 | Abileah | |
| 5,146,415 A | 9/1992 | Faris | |
| 5,161,041 A | 11/1992 | Abileah | |
| 5,190,370 A | 3/1993 | Miller | |
| 5,207,493 A | 5/1993 | Murase et al. | |
| 5,247,390 A * | 9/1993 | Hed | 359/599 |

(Continued)

FOREIGN PATENT DOCUMENTS

DE    3407431    8/1985

(Continued)

OTHER PUBLICATIONS

U.S. Appl. No. 10/830,733, Title Optical Products for Displays, Filed Apr. 23, 2004, Nakayama et al., Number of pages, 16 specifications, 3 drawings.

(Continued)

*Primary Examiner*—Jacob Y Choi
(74) *Attorney, Agent, or Firm*—Scott A. Bardell

(57) ABSTRACT

In a new packaging method for light management films in displays, such as liquid crystal displays, a stack of two or more optical films is held together before insertion into the display frame. The stack includes at least two of the films that are adhered together using adhesive positioned outside the viewing area of the films. In some embodiments, the adhesive is provided at one or more tabs provided around the periphery of the film stack.

20 Claims, 10 Drawing Sheets

U.S. PATENT DOCUMENTS

| | | | |
|---|---|---|---|
| 5,268,782 A | 12/1993 | Wenz et al. | |
| 5,280,371 A | 1/1994 | McCartney, Jr. | |
| 5,394,255 A | 2/1995 | Yokota | |
| 5,435,963 A * | 7/1995 | Rackovan et al. | 264/509 |
| 5,467,208 A | 11/1995 | Kokawa | |
| 5,492,590 A | 2/1996 | Sakai et al. | |
| 5,521,797 A | 5/1996 | Kashima | |
| 5,550,657 A | 8/1996 | Tanaka | |
| 5,552,907 A | 9/1996 | Yokota | |
| 5,592,332 A | 1/1997 | Nishio | |
| 5,596,429 A | 1/1997 | Kokawa | |
| 5,598,280 A | 1/1997 | Nishio | |
| 5,600,455 A | 2/1997 | Ishikawa | |
| 5,600,462 A | 2/1997 | Suzuki | |
| 5,627,926 A | 5/1997 | Nakamura | |
| 5,659,408 A | 8/1997 | Wenyon | |
| 5,748,269 A | 5/1998 | Harris et al. | |
| 5,767,931 A | 6/1998 | Paczkowski | |
| 5,771,328 A | 6/1998 | Wortman | |
| 5,828,488 A | 10/1998 | Ouderkirk et al. | |
| 5,868,892 A | 2/1999 | Klima, Jr. | |
| 5,919,551 A | 7/1999 | Cobb, Jr. | |
| 5,997,964 A | 12/1999 | Klima, Jr. | |
| 6,052,164 A | 4/2000 | Cobb, Jr. | |
| 6,079,840 A | 6/2000 | Ono et al. | |
| 6,104,854 A | 8/2000 | Masaki | |
| 6,185,043 B1 | 2/2001 | Imamura | |
| 6,191,833 B1 | 2/2001 | Hirakata | |
| 6,219,127 B1 | 4/2001 | Hirakata et al. | |
| 6,305,812 B1 * | 10/2001 | Kim et al. | 362/632 |
| 6,322,236 B1 | 11/2001 | Campbell | |
| 6,364,497 B1 | 4/2002 | Park et al. | |
| 6,411,353 B1 | 6/2002 | Yarita et al. | |
| 6,462,794 B1 | 10/2002 | Yoshikawa et al. | |
| 6,502,945 B2 | 1/2003 | Kim et al. | |
| 6,538,709 B1 | 3/2003 | Kurihara | |
| RE38,243 E | 9/2003 | Oe et al. | |
| 6,613,421 B2 | 9/2003 | Jonza et al. | |
| 6,626,550 B2 * | 9/2003 | Choi | 362/632 |
| 6,661,482 B2 | 12/2003 | Hara | |
| 6,661,487 B2 * | 12/2003 | Takahashi et al. | 349/115 |
| 6,685,795 B1 | 2/2004 | Braun | |
| 6,708,595 B1 | 3/2004 | Chaussade et al. | |
| 6,846,089 B2 * | 1/2005 | Stevenson et al. | 362/627 |
| 6,847,417 B2 * | 1/2005 | Kim | 349/58 |
| 6,891,580 B2 | 5/2005 | Jang et al. | |
| 6,913,365 B2 | 7/2005 | Masaki et al. | |
| 2002/0080598 A1 | 6/2002 | Parker et al. | |
| 2002/0124950 A1 | 9/2002 | Klima | |
| 2002/0149712 A1 | 10/2002 | Kitamura et al. | |
| 2002/0196397 A1 * | 12/2002 | Takahashi et al. | 349/115 |
| 2003/0063251 A1 | 4/2003 | Murata et al. | |
| 2003/0133207 A1 * | 7/2003 | Minami et al. | 359/885 |
| 2004/0141103 A1 | 7/2004 | Kotchick | |
| 2004/0150874 A1 | 8/2004 | Suzuki | |
| 2006/0108050 A1 | 5/2006 | Satake et al. | |

FOREIGN PATENT DOCUMENTS

| | | |
|---|---|---|
| EP | 0395957 | 11/1990 |
| EP | 0 531 939 | 3/1993 |
| EP | 0 770 899 | 5/1997 |
| EP | 1134068 | 9/2001 |
| EP | 1168282 A | 1/2002 |
| EP | 1220014 | 7/2002 |
| EP | 1302922 | 4/2003 |
| JP | 6-18707 | 1/1994 |
| JP | HEI-6-342106 | 12/1994 |
| JP | 07-078254 | 3/1995 |
| JP | 08248209 | 3/1995 |
| JP | 09-127309 | 5/1997 |
| JP | 09-267424 | 10/1997 |
| JP | 11259021 | 9/1999 |
| JP | 2001301104 A | 10/2001 |
| JP | 2002304254 A | 10/2002 |
| JP | 2003-207767 | 7/2003 |
| KR | 1019970007399 | 2/1997 |
| WO | WO 9527929 | 10/1995 |
| WO | WO 96/17757 | 9/1996 |
| WO | WO 97/28468 | 8/1997 |
| WO | WO 0150160 | 7/2001 |
| WO | WO 0221167 A | 3/2002 |
| WO | WO 03010569 | 2/2003 |
| WO | WO 03/042747 | 5/2003 |

OTHER PUBLICATIONS

U.S. Appl. No. 10/750,553, Title A Cover Removal Tab For Optical Products, Filed Dec. 31, 2003, Freking et al., Number of pages, 13 specifications, 4 drawings.

U.S. Appl. No. 11/036,521, Title: Pre-Stacked Optical Films, Filed Jan. 14, 2005, Freking et al., Number of pages: 13 specifications, 8 drawings.

US 2001/0013282 A1, 08/2001, LaBelle et al. (withdrawn)

* cited by examiner

ADHESIVE STACKING FOR MULTIPLE OPTICAL FILMS

FIELD OF THE INVENTION

The present invention is directed to optical displays, and more particularly to an approach for packaging light management optical films used in optical displays.

BACKGROUND

Optical displays, such as liquid crystal displays (LCDs) are becoming increasingly commonplace, finding use, for example in mobile telephones, hand-held computer devices ranging from personal digital assistants (PDAs) to electronic games, to larger devices such as laptop computers, and LCD monitors and television screens. The incorporation of light management films into optical display devices results in improved display performance. Different types of films, including prismatically structured films, reflective polarizers and diffuser films are useful for improving display parameters such as output luminance, illumination uniformity, viewing angle, and overall system efficiency. Such improved operating characteristics make the device easier to use and may also increase battery life.

The light management films are stacked, one by one, into the display frame between a backlight assembly and the flat panel display. The stack of films can be optimized to obtain a particular desired optical performance. From a manufacturing perspective, however, several issues can arise from the handling and assembly of several discrete film pieces. These problems include, inter alia, the excess time required to remove protective liners from individual optical films, along with the increased chance of damaging a film when removing the liner. In addition, the insertion of multiple individual sheets to the display frame is time consuming and the stacking of individual films provides further opportunity for the films to be damaged. All of these problems can contribute to diminished overall throughput or to reduced yield, which leads to higher system cost.

SUMMARY OF THE INVENTION

In view of the problems listed above, the present invention is directed to a new packaging method in which two or more optical films are held together in a stack together before insertion into the display frame. This makes handling of the films easier, reduces the number of steps required for assembly of the display device, reduces the chance of damaging the films and increases yields.

Generally, the present invention relates to packaging stacks of two or more light management films, where at least two of the films are adhered together using adhesive positioned outside the viewing area of the films. In some embodiments, the adhesive is provided at one or more tabs provided around the periphery of the film stack.

In one embodiment, the invention is directed to a light management film package for managing light within a display. The package comprises a stack of at least first and second optical films. Each of the at least first and second optical films has at least one peripheral tab. The at least one peripheral tabs of the at least first and second optical films are in relative alignment. A layer of adhesive is disposed between the at least one peripheral tabs to adhere the at least first and second optical films to each other.

Another embodiment of the invention is directed to a display system that includes an illumination unit, a display unit; and a light management unit disposed between the illumination unit and the display unit to manage light passing from the illumination unit to the display unit. The light management unit comprises a stack of at least first and second optical films. Each of the at least first and second optical films has at least one peripheral tab. The at least one peripheral tabs of the at least first and second optical films are in relative alignment. A layer of adhesive is disposed between the at least one peripheral tabs to adhere the at least first and second optical films to each other.

Another embodiment of the invention is directed to a method for stacking optical films for an optical display. The method includes adhering, with an adhesive layer, a first optical film to a second optical film at portions of the first and second optical films corresponding to peripheral optical tabs. The first and second optical films are cut to produce respective first and second optical film segments having respective peripheral tabs. The first and second optical films form a film stack having aligned and adhered peripheral tabs.

Another embodiment of the invention is directed to a light management film package for managing light within a display. The package comprises a first optical film having a first peripheral edge, with at least one first peripheral tab disposed on the first peripheral edge. A second optical film is disposed over the first optical film. The second optical film has a second peripheral edge, with at least one second peripheral tab disposed on the second peripheral edge. The at least one second peripheral tab is aligned with the at least one first peripheral tab. The at least one second peripheral tab is adhered to the at least one first peripheral tab with an adhesive.

Another embodiment of the invention is directed to a display system that has an illumination unit, a display unit and a light management unit disposed between the illumination unit and the display unit. The light management unit manages light passing from the illumination unit to the display unit. The light management unit comprises a stack of at least first and second optical films. The first optical film has a first peripheral edge, with at least one first peripheral tab disposed on the first peripheral edge. The second optical film is disposed over the first optical film. The second optical film has a second peripheral edge, with at least one second peripheral tab disposed on the second peripheral edge. The at least one second peripheral tab is aligned with the at least one first peripheral tab. The at least one second peripheral tab is adhered to the at least one first peripheral tab with an adhesive.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
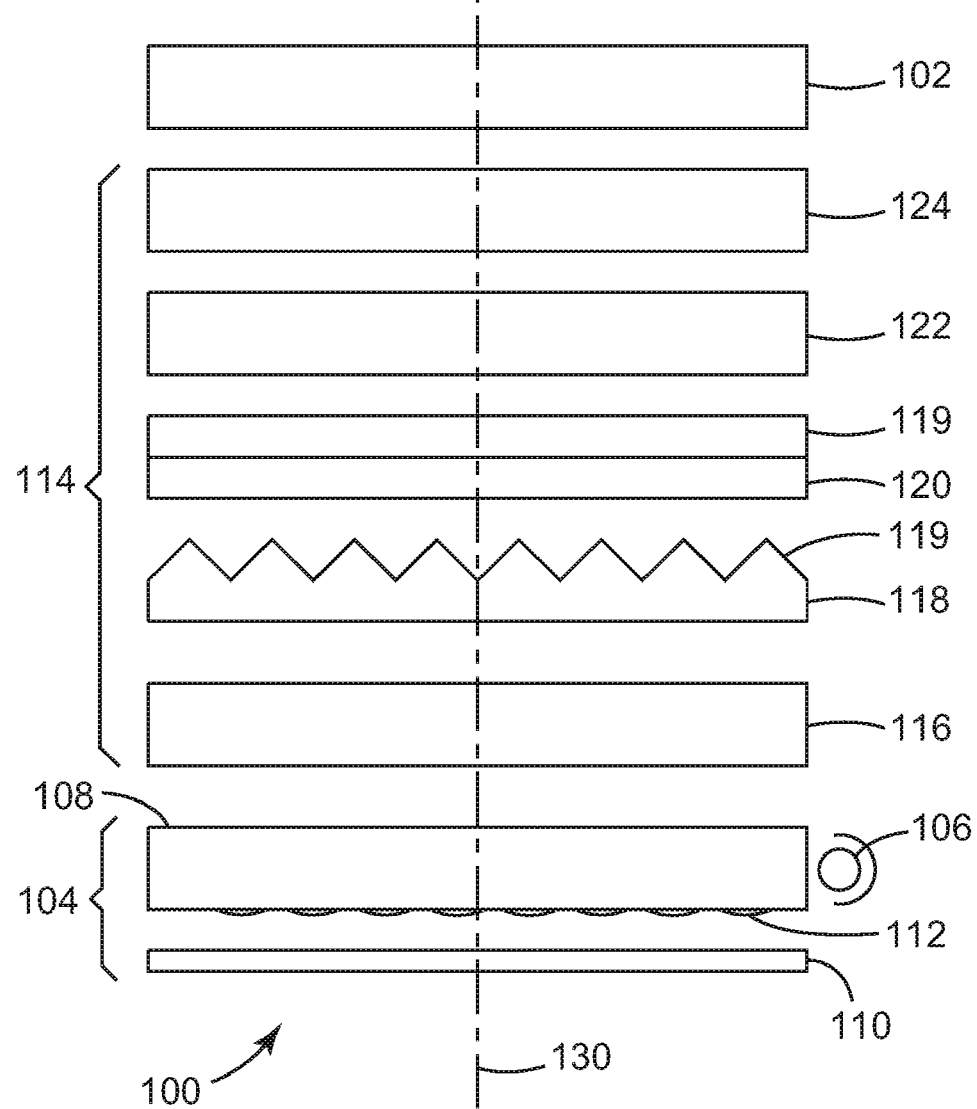
FIG. 1 schematically illustrates a display unit.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is applicable to displays, such as liquid crystal displays, and is particularly useful for reducing the number of steps required for making such a display.

A display system 100 is schematically shown in FIG. 1. The system includes in electronic display element 102, such as a liquid crystal display (LCD) panel, which is typically sandwiched between two glass layers. Furthermore, the display element 102 may include absorbing polarizers above and below the LCD panel to provide the polarization contrast typically required for producing a polarization-based image.

A backlight assembly 104 may be used as the primary light source for the display element 102, or may be used for providing light through the display element 102 when there is insufficient ambient light for the user to view the image formed by the display element 102. In one particular embodiment, backlight assembly 104 may include several elements such as a light source 106, a light guide 108, and one or more reflector layers 110. An important feature of the display system 100 in many applications is that the total thickness of the system 100 be small. Accordingly, the light source 106 is commonly positioned to the side of the light guide 108, and the light guide 108 directs the light from the light source 106 up through the system 100 towards the display element. The light source 106 may be any suitable type of light source. In many applications, it is desirable to illuminate the display 100 with white light, in which case the light source 106 may be a fluorescent lamp, an array of light emitting diodes whose colors are mixed to produce white light, or the like.

In the illustrated embodiment, the light guide 108 is provided with diffusely reflecting regions 112 that direct light from the light guide 108 towards the display element 102. The light guide 108 may include other types of elements for directing light towards the display element 102, such as light extraction regions on the upper surface of the light guide 108 facing the display element. Light extraction features may also be provided on both the upper and lower surfaces of the light guide 108. It will be appreciated that the light guide 108 may be in the form of a slab, as illustrated, but may also be in another geometry, for example a wedge. Also, other devices may be used to transmit light from the light towards the display element 102.

Other embodiments of backlight assembly may also be used, for example, the backlight assembly may be formed with an array of lamps positioned in a suitable reflective cavity. While there are several other options for the design of backlight assembly, it should be appreciated that the specific design of the backlight assembly is not important for the present invention.

A number of light management films are typically interposed between the backlight assembly 104 and the display element 102 in a light management film stack 114. The light management film stack 114 typically contains a number of films to control various optical characteristics of the light incident on the display element 102. For example, the light management film stack may include a first diffuser film 116. The first diffuser film may be used to help homogenize the intensity of the light passing up through the film stack 114.

Films 118 and 120 may be structured films, each having a row of prism-shaped ribs 119 running across its upper surface. The prism-shaped ribs help to direct the light towards the optical axis 130 of the system 100. The ribs 119 of the film 118 redirect the light in a direction parallel to the plane of the figure. The ribs of the film 120 are typically arranged non-parallel to those of the film 118. The ribs of the film 120 may be perpendicular to the ribs 119 of the film 118 so that the ribs of the film 120 redirect the light in a direction perpendicular to the plane of the figure. This may be referred to as a crossed-structure configuration. In another embodiment (not shown), the layers 118 and 120 may be substituted with a single structured optical film that redirects light received from the backlight assembly 104.

The stack 114 may also include a reflective polarizer layer 122. This layer is useful for recycling light from the backlight assembly 104 that is in the wrong polarization state for transmission through the display element 102 as image light. The light reflected by the reflective polarizer 122 may be diffusely reflected by the reflector 110, with some polarization mixing, so that at least a portion of the reflected light makes it through to the display element 102 with the correct polarization state for use as image light. In addition, a polarization converter, for example a quarter wave retarder layer may be used to convert the polarization of the light reflected from the reflective polarizer 122. The reflective polarizer 122 may be any suitable type of reflective polarizer, for example a multi-polymer layer film, a cholesteric polarizer or a wire-grid polarizer.

The stack 114 may also include another sheet 124, often referred to as a "cover sheet". The cover sheet 124 may be a relatively weak diffuser. The diffuser sheets 116 and 124 may be useful for making the illumination of the display element 102 uniform to the viewer. The cover sheet 124 may also include a shading frame, which is a mask to define the viewing area of the film stack 114, or to mask edge effects of the backlight 104 or of the stack 114. It should be noted that depending on the actual system design, some of the elements represented by layers 116-124 may be missing, added to, or substituted with other functional elements.

With such a film stack 114, each of the discrete optical film layers 116-124 must be individually inserted to the display frame during manufacture. Since it is often important to reduce the thickness of the films 116-124, to reduce overall display thickness, the individual films 116-124 may be made very thin. As a result, the individual film stiffness may be low, which can result in increased difficulty in handling, processing, and assembly during manufacture. Also, because these film layers often have precise optical functionality, the introduction of surface defects, such as scratches or debris may compromise total system performance. Often, each film layer is provided with dual side protective liners, which must be removed prior to insertion into the backlight assembly. The action of liner removal and the resulting insertion into the backlight assembly can expose the delicate film to a host of potential modes of defect introduction. Examples of such defects include scratching, lint and other debris attracted to the film surfaces due to the build up of static electricity. In addition, the removal of the liners requires additional fabrication steps, and so the reduction in the number of liners to be removed results in fewer manufacturing steps, with concomitant savings in manufacturing costs. When multiple film layers are incorporated into the backlight assembly, the probability of creating/introducing a defect can grow ever higher, which can result in slower manufacturing throughput due to excessive re-work and higher unit costs.

This invention is directed to approaches to holding together various optical film layers and/or components in a stack in order to improve handling and final backlight/system assembly efficiency.

One method of holding at least two optical layers together in a stack includes inserting an adhesive layer between peripheral tab portions of the layers. Such adhesive bonding can accomplish multiple film adhesion, but each adhesive layer may add an incremental thickness, typically of the order of 30 μm. In certain circumstances, such an increase in the overall thickness of the film stack may be acceptable in the final construction. Also, where the adhesive layer is limited to the periphery of the optical film, outside the viewing area of the film, the adhesive layer does not result in deterioration in the refractive properties of any structured film surface that may be present. Thus, the technique may be used for stacking films that have a structured refractive surface, such films as the prismatic films 118 and 120.

Figure 2A:
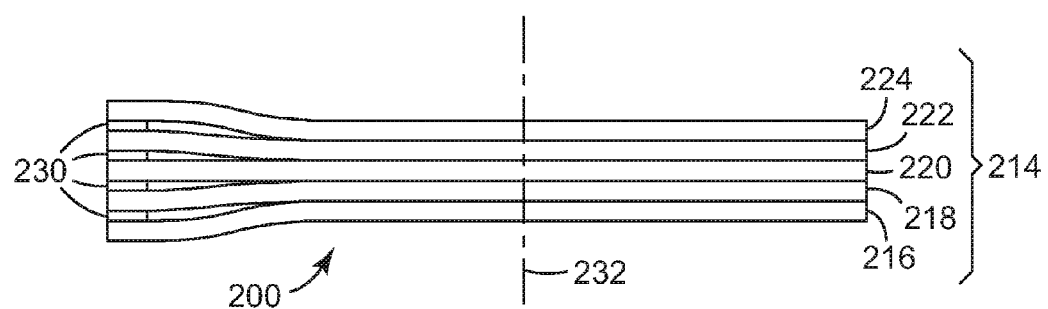
FIG. 2A schematically illustrates a light management film unit according to an embodiment of the present invention.

One approach to forming an adhered film stack 200 according to the present invention is schematically illustrated in FIG. 2A. Layers 216-224 represent different optical layers as may be found in a light management film stack in a display system. For example, layer 216 may be a diffuser layer, and layers 218 and 220 may be prismatically structured films for directing light, the orientation of layer 220 being crossed with respect to layer 218. Layer 222 may be a reflective polarizer layer while layer 224 may be a diffuser layer.

The adhesive 230 represents a layer of adhesive that secures adjacent film layers together. Adhesive 230 is limited in extent so as to that permit the presence of an air gap between unadhered portions of the film layers, for example where the surface of one of the films contains structure. Such an air gap may be useful in maintaining the efficient operation of certain optical films, such as structured optical films 218 and 220, for redirecting light towards the axis 232 of the stack 214. Adhesive 230 is typically located along an edge of the film layers, or on one or more side tabs of the layers 216-224. Such tabs may also serve as registration elements for mounting the stack 200 into the display frame.

Figure 2B:
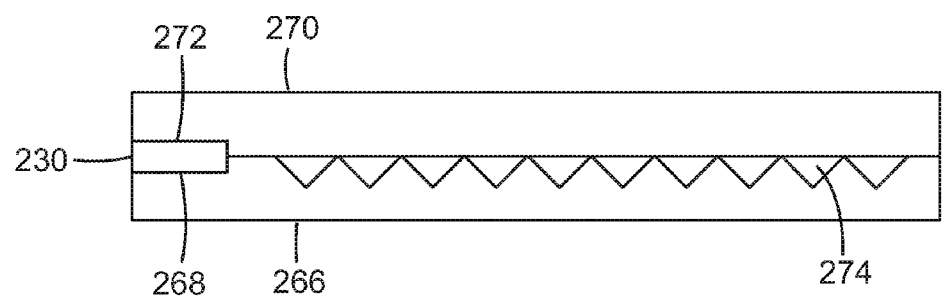
FIG. 2B schematically illustrates a light management film unit according to another embodiment of the present invention.

Another embodiment of a film stack is schematically illustrated in FIG. 2B, in this case showing an adhesive layer 230 between a prismatically structured film 266 and another film 270. One or both of the films 266 and 270 may be indented to receive the adhesive 230. The height of the indent(s) 268 and 272 may be sufficient to accept the layer of adhesive while adding little or no extra height to the stack of films 266 and 270. The air gap 274 between the films 266 and 270 permits the prismatically structured film to redirect the light passing therethrough, but does not add to the thickness of the film stack.

Different approaches may be used to reduce or prevent the degradation of the optical quality of the stacked films. For example, care is taken to reduce the presence of contaminant particles between the films that may lead to Newton's rings. Further, one or both of the surfaces that touch together may be provided with small height variations to reduce wet-out, for example as is discussed in U.S. Pat. No. 6,322,236, incorporated herein by reference. Also, a prismatically structured film may be provided with a variable height structured surface, as described in U.S. Pat. No. 5,771,328, incorporated herein by reference.

Different types of adhesive 230 may be used, for example a pressure sensitive adhesive (PSA), a radiation cured resin, a hot melt glue, or an epoxy system. The adhesive may be applied as a transfer adhesive via a dry lamination process or wet coated adhesive using such techniques as screen printing or gravure coating.

Figure 3A:
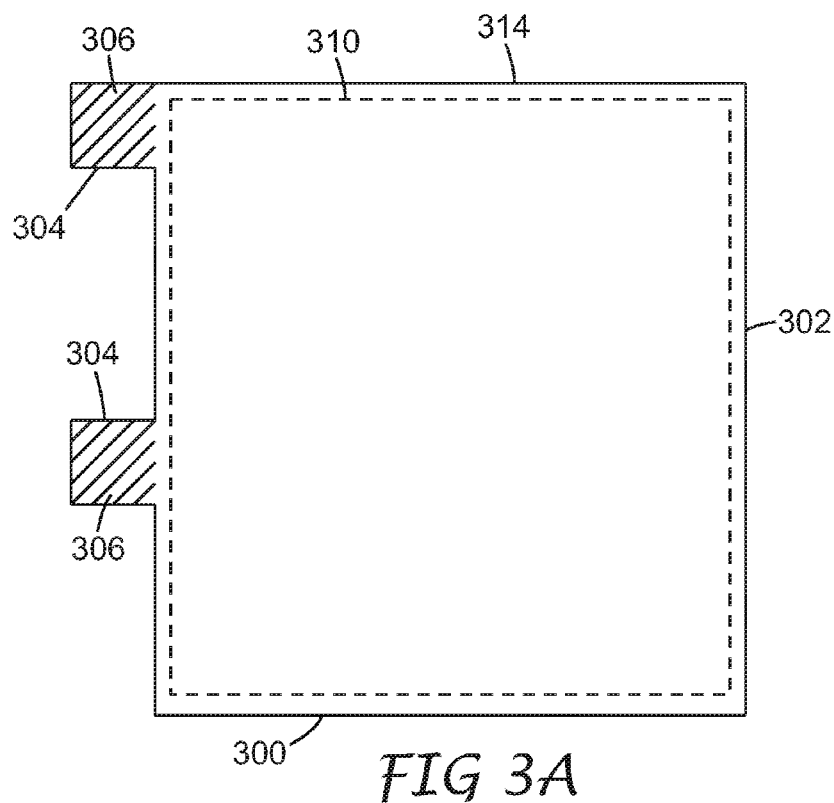
FIGS. 3A-3C schematically illustrate top view of different embodiments of a light management film unit according to principles of the present invention.

A top view of a stack 300 of films is schematically presented in FIG. 3, showing only the topmost film sheet 302. The films in the stack have one or more peripheral tabs 304. The tabs 304 may take on many different shapes, number, and location depending on the specific design of the final backlight/system assembly. In the illustrated embodiment, the shaded areas 306 correspond to areas provided with adhesive to adhere to the layer below.

The tabs 304 may provide a convenient area to hold the stack 300 during assembly or inspection, and may also be used for registering the film stack when mounting the stack with the display. In addition, the tabs 304 may be provided in a non-symmetric pattern around the film. This helps an assembler to immediately identify which side of the film stack is uppermost, thus enabling quicker assembly of the display unit, and reducing errors from incorrectly inserting a film in an inverted position.

Figure 3B:
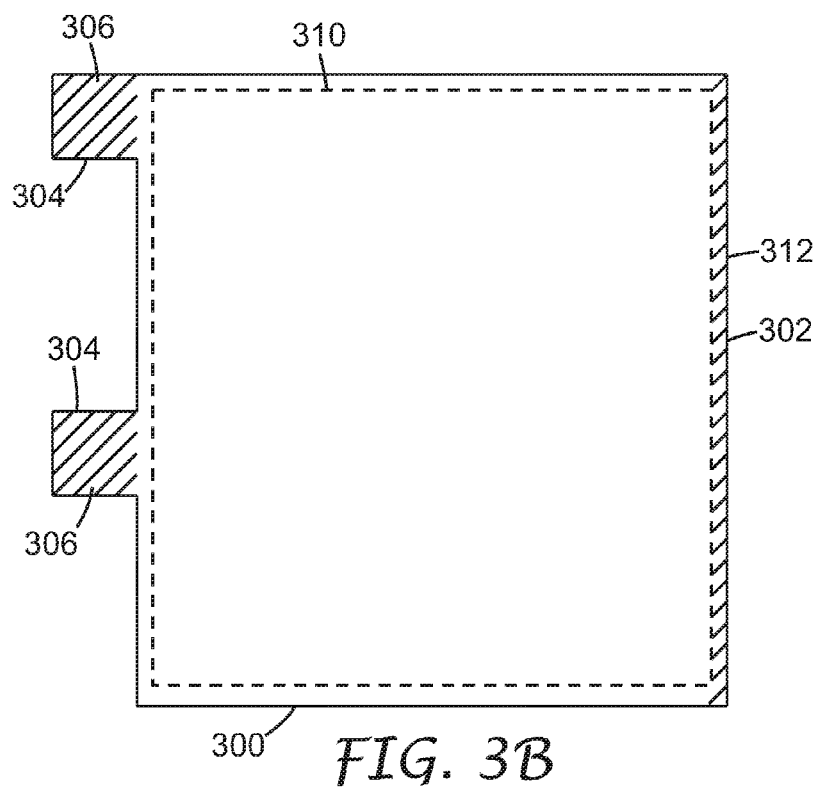

The portions of the films, through which the light passes to the display element and to the viewer, are referred to as viewing areas. The viewing area of the topmost film 302 is shown schematically as the area enclosed within the dashed lines 310. In order to reduce the size of the film package, the viewing area preferably takes up as much of the film area as possible. The viewing area may extend, in some cases therefore, to the edge of the film. Furthermore, it is important to maintain high optical quality in the viewing area. Since some adhering techniques change the optical qualities of the film, it is important in many circumstances to place the adhesive outside the viewing area. Thus, the adhesive 312 may be disposed on at least a portion of the peripheral edge 314 of the film itself, for example as schematically illustrated in FIG. 3B.

Figure 3C:
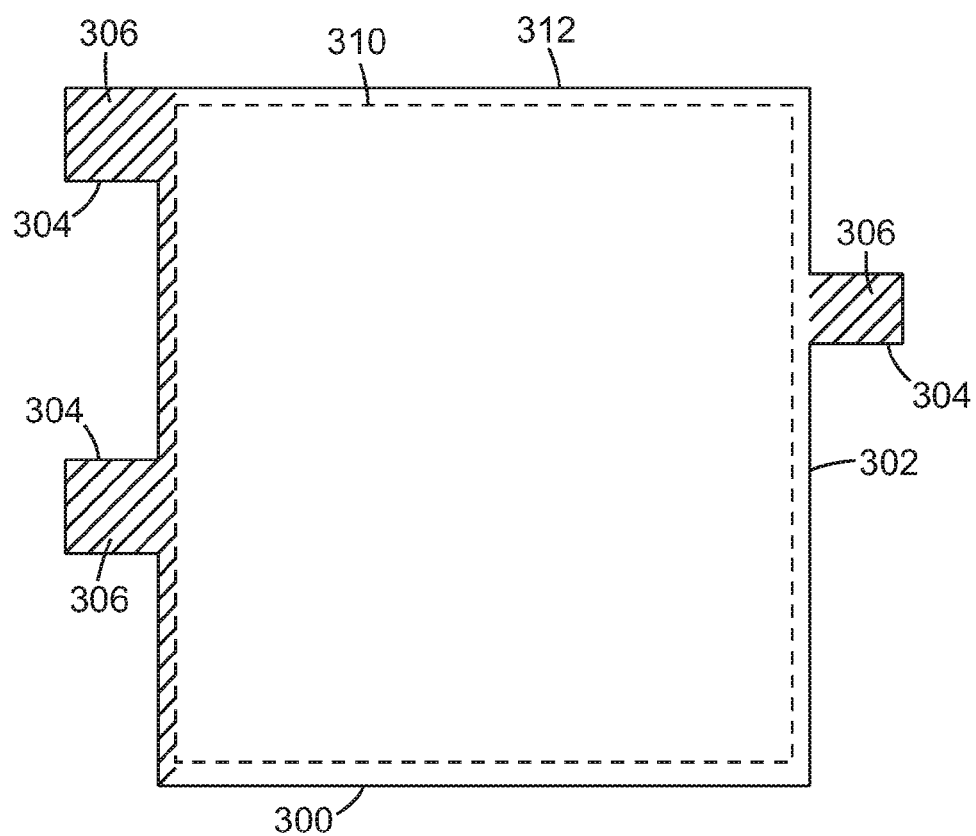

Another embodiment of a film stack is schematically illustrated in FIG. 3C. In this embodiment, there are tabs 304 provided on two sides of the stack, and the peripheral edge on which some adhesive 306 is disposed is also an edge that has tabs 304. It will be appreciated that many different combinations and placements of tabs are possible, and that different sides of the stack may receive adhesive.

The choice of an adhesive layer for use in adhesively stacking optical films may be similar to those described in Table I.

TABLE I

Example Adhesives and Characteristic Thicknesses

| | Adhesive Properties | |
|---|---|---|
| Adhesive Choice | Total Adhesive Thickness (Including Carrier) [mils] | PET Carrier Thickness [mils] |
| Teraoka 707 | 1.1 | N/A |
| 3M 9019 | 1.1 | 0.5 |
| 3M 9313 | 1.1 | 0.5 |
| 3M 9009 | 1.9 | 0.5 |
| 3M 467 MP | 2.3 | None |
| 3M 4597 | 2.4 | 0.6 |
| 3M 9492 | 2.5 | 0.5 |

Figure 4:
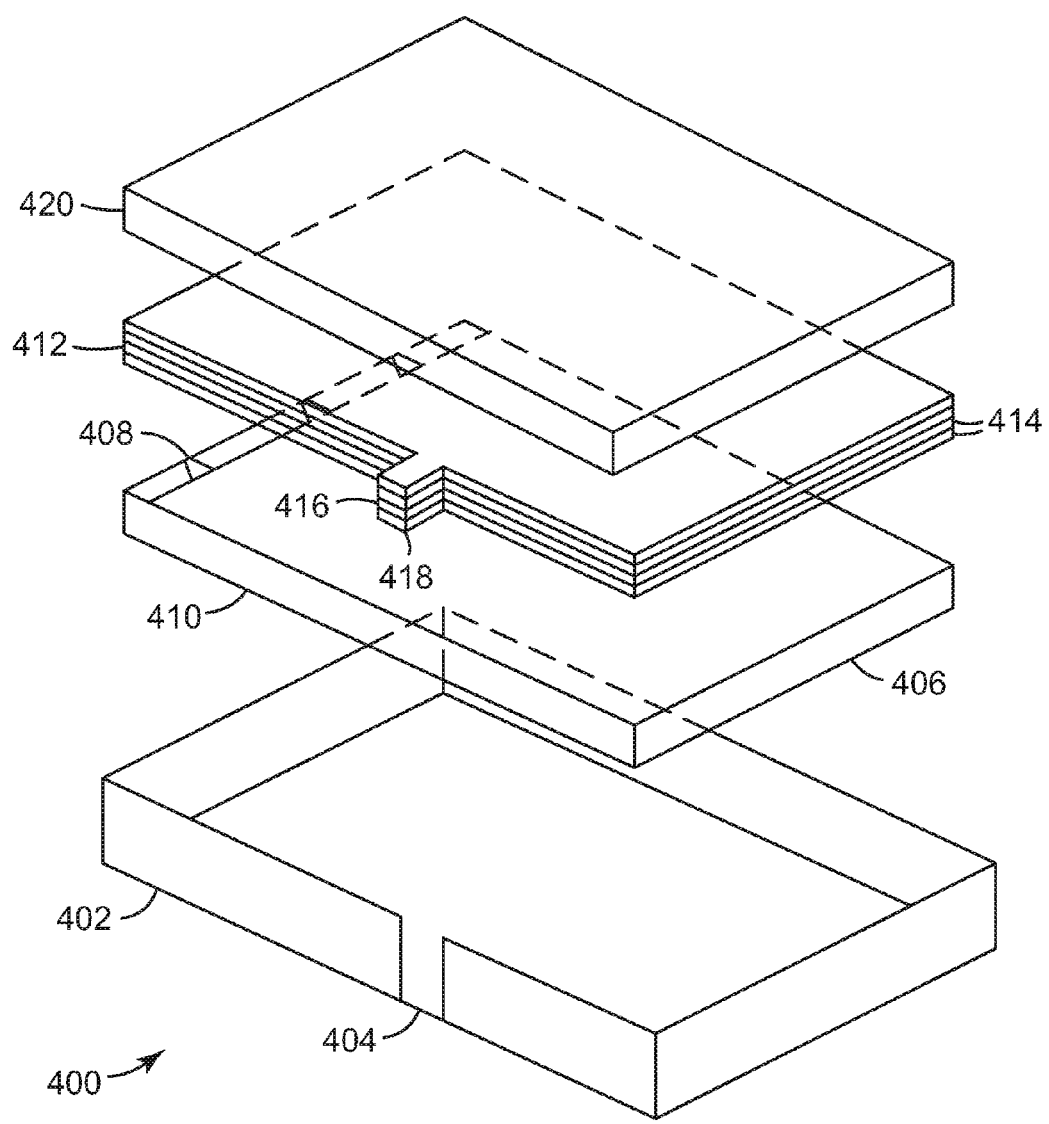
FIG. 4 schematically presents a perspective view of a display unit according to an embodiment of the present invention.

An exploded view of an embodiment of a display 400 is presented in FIG. 4, showing how the different parts of a display may be assembled to form the display. In this particular embodiment, the display 400 uses a frame 402 to contain the other components. The frame 402 may contain one or more slots 404, or other alignment features, for example pins or the like, for aligning the films in the light management film stack.

The backlight assembly 406 is the first component placed within the frame 402. The backlight assembly 406 includes one or more light sources 408 that illuminate the edge of the light guide 410. The light management film stack 412 is then positioned above the backlight assembly 406. The light management film stack 412 includes two or more light management films 414 that are adhered together using an adhesive 416. In the illustrated embodiment, the adhesive 416 is located on the alignment tab 418 that aligns the film stack 412 with the alignment slot 404. The display element 420, for example a liquid crystal display element, including polarizers, is positioned above the light management film stack 412.

It will be appreciated that the light sources 408 and the display element have electrical connections to receive electrical power and control signals. The electrical connections are not shown.

Figure 5:
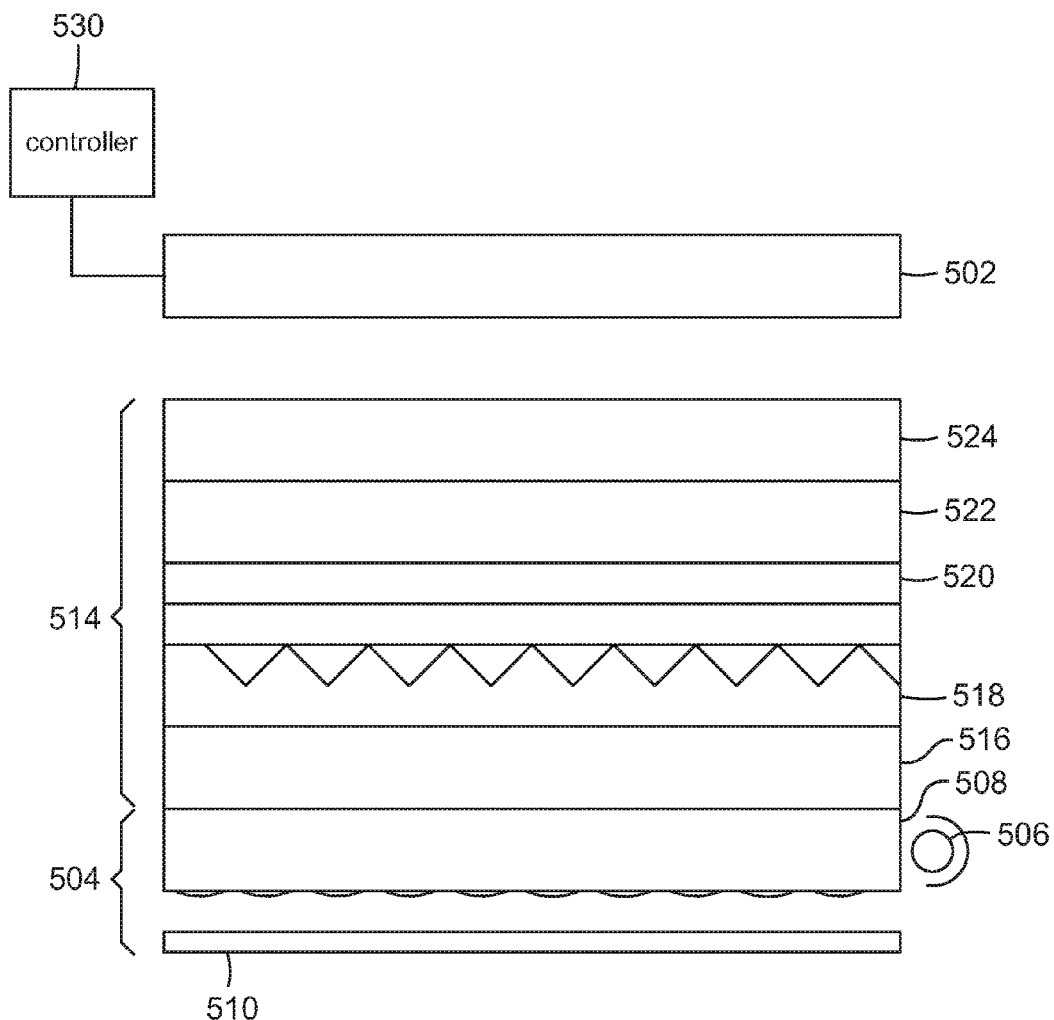
FIG. 5 schematically illustrates an embodiment of a display unit according to principles of the present invention.

The light management film stack may also be attached directly to one of the display elements. One example of such a display is schematically illustrated in FIG. 5. In this particular embodiment, a film stack 514 is formed from a stack of adhered films 516-524. In the illustrated embodiment, films 518 and 520 are prismatically structured films. Film 516 may be a diffuser or may be a light turning film, for example a prismatically structured film with the prismatically structured surface facing towards the backlight assembly 504.

The display also includes a display element 502 and a backlight assembly 504, having a light source 506, a light guide 508, and a lower reflector 510. The optical film stack 514 contains at least two films adhered together using one of aforementioned methods. The film stack is then anchored to another element of the display unit, such as the display element 502 and/or the backlight assembly 504.

In the illustrated embodiment, the film stack 514 is attached to the backlight assembly 504, for example using adhesive around the edges of film 516 and the light guide 508. In another embodiment, the optical film stack 514 may be anchored to the display element 502 or to the frame (not illustrated). This approach may be advantageous as it may be performed automatically, thereby avoiding manual insertion of the optical film stack. In this way, the introduction of defects may be minimized and manufacturing throughput and unit costs can be improved.

In some embodiments, the lower film 516 may extend beyond the right edge of the stack 514 and the overhanging portion of the film 516 may be used as a base on which to mount the light source 506.

A controller 530, for example a processor or the like, is typically coupled to the display element 502 to control the image seen by the viewer.

The use of an adhered film stack in such devices as flat panel displays offers several advantages. Many of the light management films used in a display are very thin. For example the prismatically structured films may each have a thickness of about 62 μm, while a reflective polarizer may have a thickness in the range of about 1 μm to 100's of μm. Light management films used in displays also tend to be very flexible, which may cause problems during assembly of the display. Holding multiple thin, flexible films together in a stack, on the other hand, creates a stiffer film pack, which can ease assembly issues. Eliminating the sequential stacking of discrete layers when assembling the display also minimizes the probability of defect introduction and ultimate yield loss. Additionally, since films are usually delivered by the manufacturer to the display integrator with protective linings on either side, the number of protective liners that the display integrator has to remove is reduced when the films are held together in a stack. This further optimizes yield and manufacturing unit costs.

Also, the stacking of optical films may improve final inspection and quality yield versus the separate examination of each discrete film layer. This can be easily considered when using structured optical films, which may tend to distort and camouflage defects in underlying or other film layers that would otherwise be detected if these layers were inspected individually.

It will be appreciated that the film stack may, in addition to including at least two films that are adhered between peripheral tabs, also include a bond between other films that is not adhesive between peripheral tabs.

Optical films are often fabricated in large sheets, in some cases on a roll. The individual film pieces that are assembled in a display are cut from the large sheet, usually by a die. Several different approaches may be used for forming film stacks. For example, the films may be die-cut to the appropriate shape and then aligned in a stack and adhered. In other approaches, the films may be adhered at the same time as being die cut, or may be adhered even before being die cut. Furthermore, stacks may be formed of two or more adhered films. It should be appreciated that a stack that includes three or more films may be formed using one or more adhering steps. For example, the first two optical films may be laminated together to form the basis of the stack, and then one or more additional films laminated to the stack. In another example, three or more optical films may be laminated together in a single lamination operation.

Figure 6:
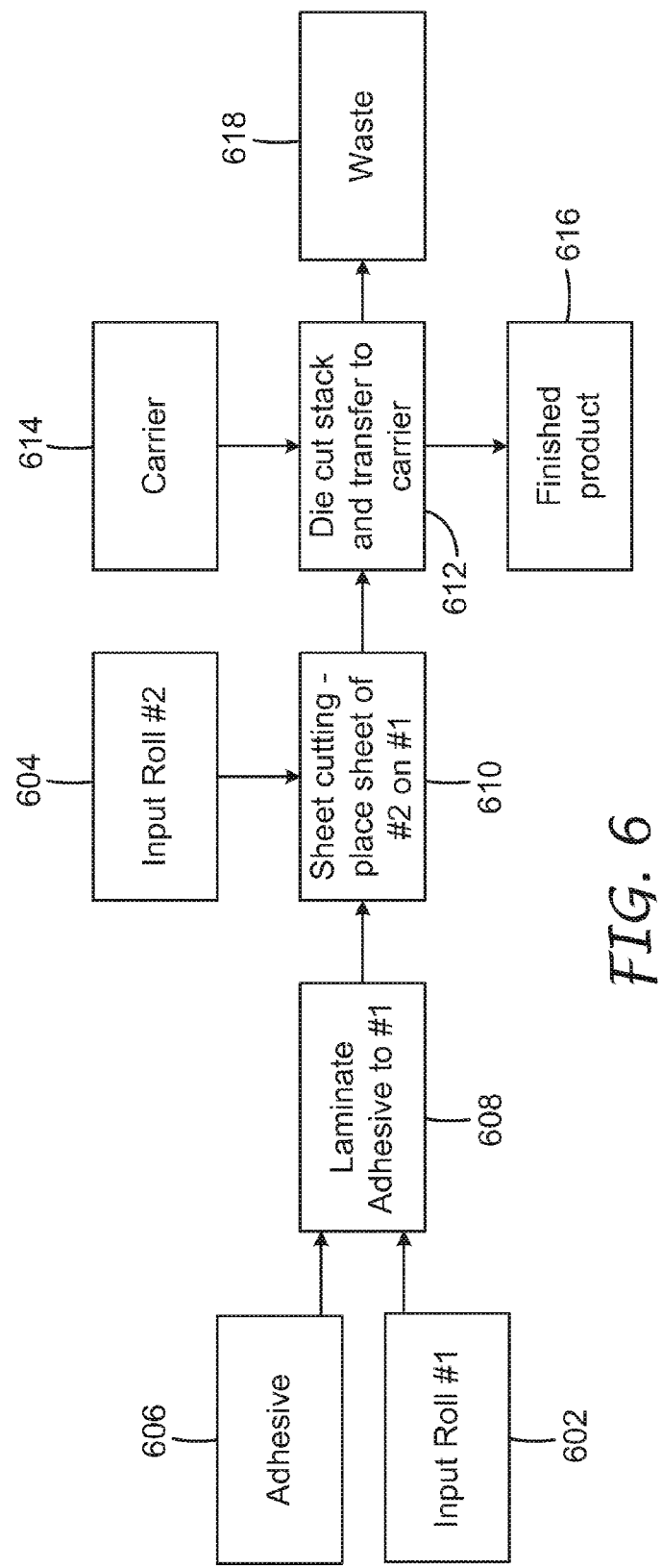
FIG. 6 schematically illustrates steps in a system useful for manufacturing a light management film unit according to principles of the present invention.

Some methods may be more advantageous for manufacturing large numbers of film stacks. One such method, referred to as a 90° indexing process, is now described with reference to FIG. 6. This process is particularly useful for adhering two films together that each have structure, where the structure of the first film is oriented perpendicular to the other film. One example of such films is the prismatic brightness enhancing film often found in liquid crystal displays. Such a film is typically formed by forming the prismatic pattern using a cylindrical roller, so that the prismatic structures lie along the web of the film. This process may also be used where the two films being adhered to each other have no preferred orientation.

The 90° indexing process takes two input rolls 602 and 604, each with a downweb structure, and unwinds them at 90° to each other. As the material from the first input roll 602 is unwound, adhesive strips 606 are laminated in a laminator 608 to the top surface of the first roll 602. Material from the second input roll 604 is unwound, cut into sheets, and placed on the top of the adhesive strips at the sheet cutting station 610. The two layers of film are now adhered to each other in a stack, with the surface structures of the two films oriented perpendicular to each other.

The stacked material proceeds to a die cutting station 612. A finished product carrier 614, or liner, is fed into the die cutting station. At the die cutting station 612, tabbed parts are cut out of the stacked material and transferred to the finished product carrier. Any suitable type of die may be used in the die cutting station, for example a flatbed die, a matched metal die or rotary dies. The process indexes and the liner with the finished part indexes out of the die for the next cut and transfer. A finished product winder 616 extracts the finished product from the die cutter, while a waste winder 618 extracts the waste material from the die cutter. The finished product and waste material winders 616 and 618 may be oriented at 90° from each other.

Figure 7:
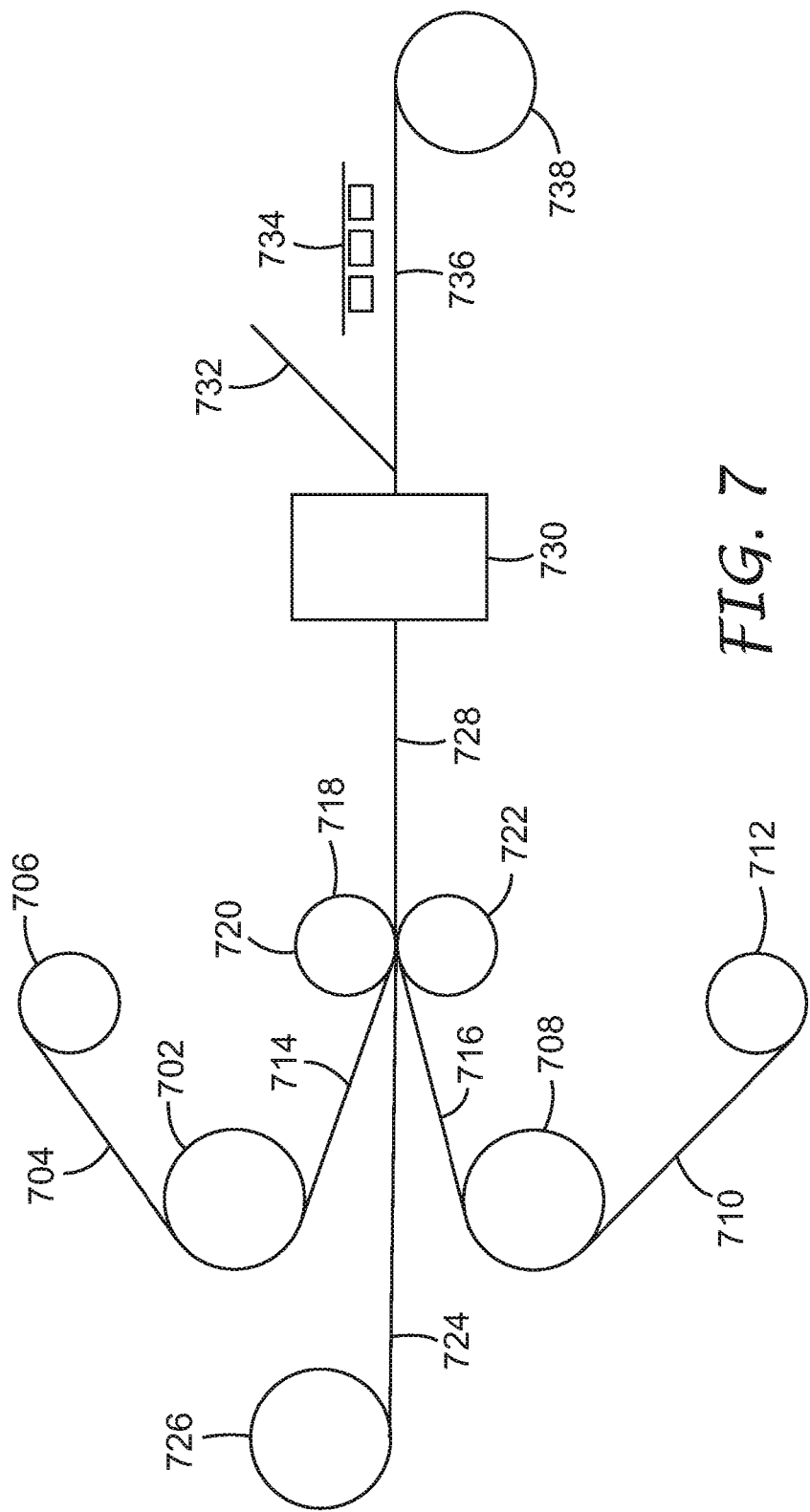
FIG. 7 schematically illustrates another embodiment of a system for manufacturing a film stack according to principles of the present invention.

Another embodiment of a process for forming an adhered stack is now is described with reference to FIG. 7. This process is particularly useful where the films being adhered have no particular orientation, or the structures on the films are such that the two films can be stacked from parallel rolls. A first film roll 702 contains a roll of film that has a liner on at least one side. The liner 704 is stripped by a stripping roll 706. A second film roll 708 may also contain a roll of film that has a liner on at least one side. The liner 710 is stripped by a second stripping roll 712. The stripped films 714 and 716 pass towards a lamination station 718 having a pair of rollers roller 720 and 722. Adhesive 724 is fed in between the stripped films 714 and 716 from an adhesive roll 726. The adhesive 724 may be shaped to include clear areas that correspond to the viewing area of the subsequent film stack. The two films 714 and 716 are laminated together in the lamination station 718 to form a laminated stack 728.

The laminated stack 728 is fed to a die cutting station 730, where a die cuts the stack shape, including the peripheral tabs. Any suitable type of die may be used in the die cutting station, for example a flatbed die, a matched metal die or rotary dies. The die is preferably phased to the clear areas of the adhesive so that the stack is cut out at those locations where there is no adhesive in the viewing area of the stack. In one particular embodiment, the die may kiss cut through the laminated stack 728 to a controlled depth, to the lower liner of the lower film. The peripheral weed 732, may then be stripped away, leaving an array of film stacks 734 on the lower liner layer 736. The lower liner layer 736 may then be received on a collection roller 738.

The two films 714 and 716 that may be any light management films. For example the first film 714 may be a prismatically structured film with the ribs oriented across the web of the film 714, while the second film 716 is a prismatically structured film with the ribs oriented along the web of the film 716. The first and second films 714 and 716 may also be other types of light management films, such as a diffuser or a reflective polarizer film.

In another method of adhering film to form an adhered stack, different films may be fed in directions at right angles to each other. For example, two rolls of optical film may contain prismatically structured film, each having the ribs structured along the web. In such a situation, the films from the two rolls may cross at right angles to each other, so that the stacked prismatic films are crossed. An adhesive layer is fed between the two optical films. A single laminating and cutting tool may be used to laminate and cut the films where they overlap with each other.

Figure 8:
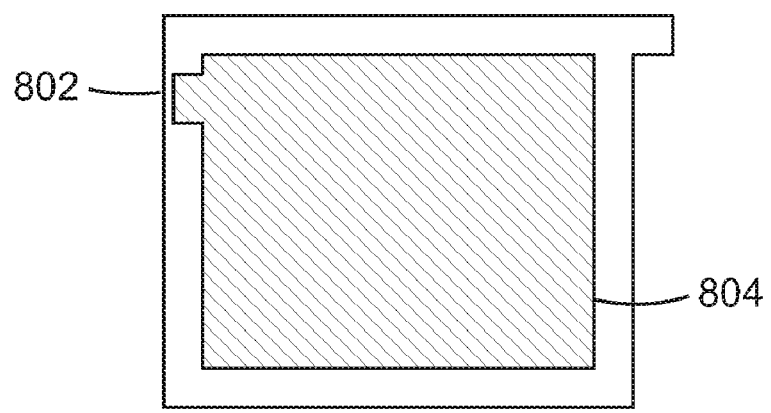
FIG. 8 schematically illustrates an embodiment of a film stack with a liner according to principles of the present invention.

A protective film may be used to protect the top surface of an optical film or optical film stack. The protective film is sometimes difficult to remove from the optical film or stack when it is cut to the exact same shape of the optical film or stack. A new design of protective film that overlaps the edges of the film or film stack makes the protective film easier to remove. FIG. 8 shows one particular style of protective film 802 (white) over the optical film stack 804 (shaded). The protective film 802 has a major surface (the surface parallel to the plane of the figure) that is different from the major surface of the film stack 804 in size and/or shape, thus providing the protective film 802 with at least one edge that overhangs the stack 804.

Figure 9:
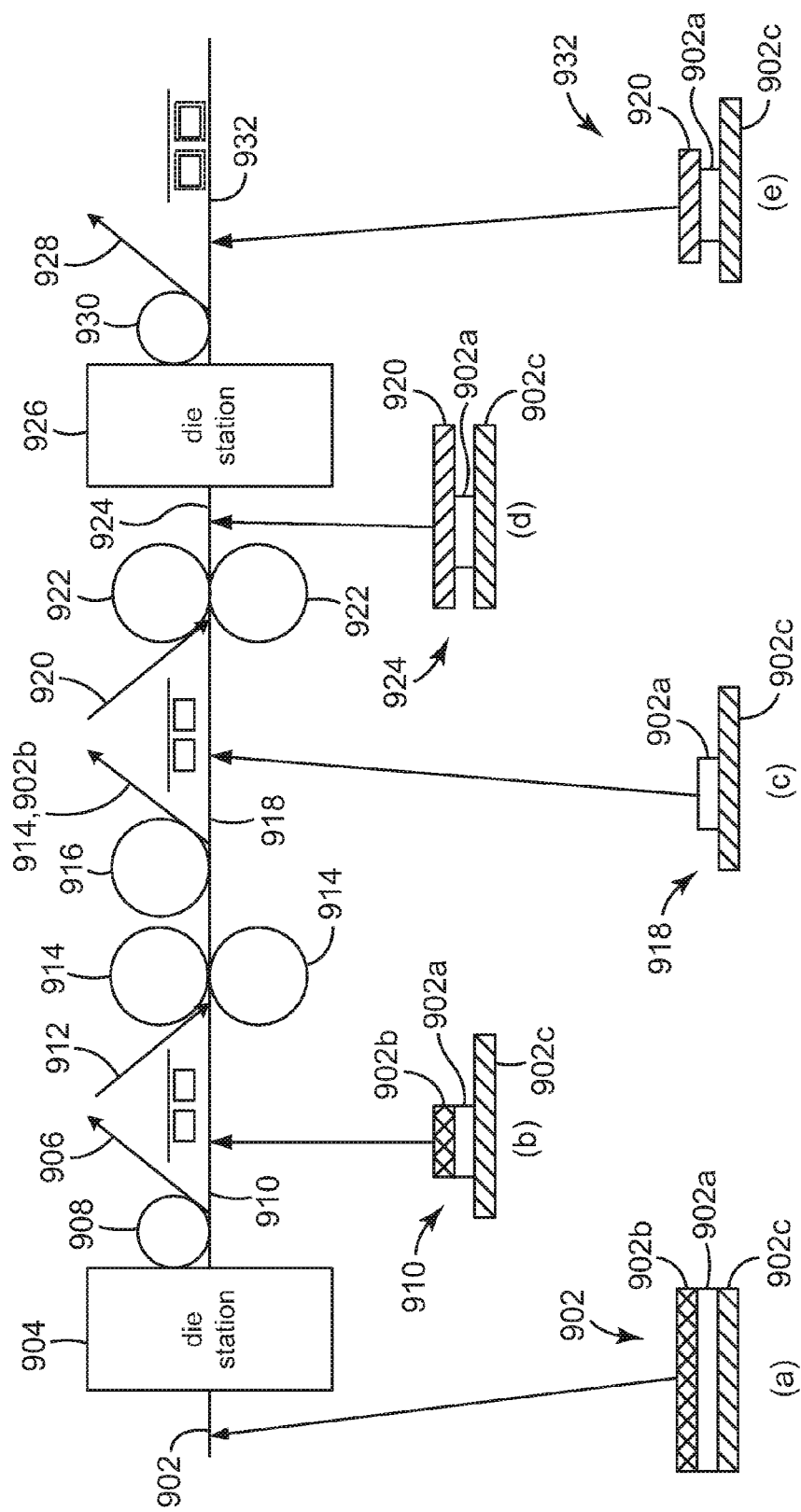
FIG. 9 schematically illustrates an embodiment of a system useful for generating a film stack with a liner as shown in FIG. 8, according to principles of the present invention.

One embodiment of a system that may be used for generating the stack illustrated in FIG. 8 is schematically illustrated in FIG. 9. In this system, a layered structure 902, comprising an optical film or optical film stack 902a layered together with an upper protective cover 902b and/or a lower protective cover 902c, is fed into a die station 904. The layered structure 902 may be formed, for example, in a previous lamination step. A schematic cross-section through the layered structure 902 fed into the die station 904 is illustrated as (a). In the die station 904, the layered structure is cut so that the optical film or optical film stack 902a is cut to shape. This typically includes cutting both the film or film stack 902a and the upper protective layer 902b. The weed 906, or waste, is extracted using a waste roller 908, to produce the layered structure 910, illustrated in schematic cross-section as (b).

In this particular embodiment, a lift-off tape 912 is laminated to the layered structure 910, over the cut upper protective layer 902b, for example by passing through lamination rollers 914. The lift-off tape 912, along with the upper protective layer 902b, is lifted off the layered structure 910, for example using a lift-off roller 916, to produce the layered structure 918. Layered structure 918 is schematically illustrated in cross-section at (c).

A second upper protective layer 920 is then laminated to the layered structure 918, for example at lamination rollers 922, to produce a layered structure 924. The layered structure 924 comprises an uncut lower protective layer 902c, a shaped optical film or film stack 902a and an uncut upper protective layer 920, as is schematically illustrated at (d).

The layered structure 924 is fed into a second die station 926, where the second upper protective layer 920 is cut to the desired size and shape. The second upper protective layer 920 may be cut without cutting the optical film or film stack 902a or the lower protective layer 902c. The waste second protective layer 928 is lifted off the layered structure produced form the second die station 926, for example using a lift-off roller 930 to produce the layered structure 932, schematically illustrated in cross-section as (e). Thus, the final layered structure 932 includes a shaped optical film or film stack 902a between an uncut lower protective layer 902c and a shaped upper protective film 920. The shaped upper protective film 920 may be cut to any desired size, independent of the size of the shaped optical film or film stack 902a. For example, one or more edges of the shaped upper protective film 920 may overhang the edges of the shaped optical film or film stack 902a, as illustrated in FIG. 8. Furthermore, one or more edges of the shaped upper film 920 may be provided with a tab to make it easier to remove the shaped upper film 920 when the optical film or film stack 902a is being assembled in a display product. Thus, the shaped upper film 920 and the lower protective layer 902c each have a major surface that is different in size and/or shape from the major surface of the optical film or film stack 902a.

In another embodiment of a method for forming a shaped upper protective layer (not illustrated), the step of lifting off the original upper protective layer 902b may be omitted, so that the shaped upper protective layer 920 is laminated over both the cut optical film or film stack 902a and the cut original upper protective layer 902b. In such a case, however, it is important that the adhesive strength of the shaped upper protective layer 920 is higher than the adhesive strength of the cut upper protective layer 902b so that, when the shaped upper protective layer 920 is removed from the layered structure 932, the cut upper protective layer 902b remains adhered to the shaped upper protective layer 920.

As noted above, the present invention is applicable to displays and believed is to be particularly useful for reducing the number of steps required for making such a display. The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. A light management film package for managing light within
    a display, comprising:
    a stack of at least first and second optical films, each of the at least first and second optical films having at least one peripheral tab, the at least one peripheral tabs of the at least first and second optical films being in relative alignment, and a layer of adhesive disposed between the at least one peripheral tabs of the at least first and second optical films to adhere the at least first and second optical films to each other.

2. A film package as recited in claim 1, wherein the first and second optical films each have respective peripheral edges in registration, at least a portion of at least one peripheral edge of the first optical film being adhered together with at least one peripheral edge of the second optical film by adhesive.

3. A film package as recited in claim 1, wherein the first optical film is a prismatic, light directing film having a prismatically structured surface towards the second optical film.

4. A film package as recited in claim 1, further comprising at least a third optical film having a third viewing area registered with the first and second viewing areas, the third optical film having at least one peripheral tab adhered to the at least one peripheral tab of the second optical film.

5. A film package as recited in claim 4, wherein the first and second optical films are prismatic, light directing films, and the third optical film is a reflecting polarizer film.

6. A film package as recited in claim 1, further comprising a display element, the stack of at least first and second optical films being attached to the display element.

7. A film package as recited in claim 1, further comprising a backlight unit, the stack of at least first and second optical films being attached to the backlight unit.

8. A film package as recited in claim 1, wherein the at least one peripheral tab on the first and second optical films are disposed around the respective optical films in a non-symmetric pattern.

9. A film package as recited in claim 1, further comprising a lower protective layer on one side of the stack and an upper protective layer on the other side of the stack.

10. A film package as recited in claim 1, wherein the stack has a viewing area, the layer of adhesive being outside the viewing area.

11. A light management film package for managing light within a display, comprising:
    a first optical film having a first peripheral edge, at least one first peripheral tab disposed on the first peripheral edge; and
    a second optical film disposed over the first optical film, the second optical film having a second peripheral edge, at least one second peripheral tab disposed on the second peripheral edge, the at least one second peripheral tab aligned with the at least one first peripheral tab, the at least one second peripheral tab being adhered to the at least one first peripheral tab with an adhesive to form a film stack.

12. A film package as recited in claim 11, further comprising a third optical film attached to the second optical film.

13. A film package as recited in claim 12, wherein the third optical film includes a third peripheral edge having at least one third peripheral tab aligned with the at least one first and second peripheral tabs, and adhered to the at least one second peripheral tab.

14. A film package as recited in claim 12, wherein the first and second optical films are prismatic, light directing films, and the third optical film is a reflecting polarizer.

15. A film package as recited in claim 11, wherein the first and second optical films each have respective peripheral edges in registration, at least a portion of the first peripheral edge being adhered to a corresponding portion of the second peripheral edge.

16. A film package as recited in claim 11, wherein the first optical film is a prismatic, light directing film having a prismatically structured surface oriented towards the second optical film.

17. A film package as recited in claim 11, further comprising a display element, the film being attached to the display element.

18. A film package as recited in claim 11, further comprising a backlight unit, the film stack being attached to the backlight unit.

19. A film package as recited in claim 11, further comprising a lower protective layer on one side of the stack and an upper protective layer on the other side of the stack.

20. A film package as recited in claim 11, wherein the stack has a viewing area, the layer of adhesive being outside the viewing area.

* * * * *